United States Patent [19]
Green

[11] Patent Number: 6,004,518
[45] Date of Patent: Dec. 21, 1999

[54] HIGH-PURITY SIMULATED MOVING BED ADSORPTIVE SEPARATION APPARATUS

[75] Inventor: J. Dennis Green, Schaumburg, Ill.

[73] Assignee: UOP LLC, Des Plaines, Ill.

[21] Appl. No.: 08/990,164

[22] Filed: Dec. 12, 1997

[51] Int. Cl.⁶ .............................. B01J 8/04; G05D 7/00; F16K 31/00; F16K 17/00
[52] U.S. Cl. ...................... 422/190; 422/114; 422/115; 422/142
[58] Field of Search .................................... 422/190, 142, 422/156, 111, 114, 115

[56] References Cited

U.S. PATENT DOCUMENTS

| | | | |
|---|---|---|---|
| 3,268,605 | 8/1966 | Boyd, Jr. | 260/666 |
| 3,706,812 | 12/1972 | DeRosset et al. | 260/674 SA |
| 4,434,051 | 2/1984 | Golem | 210/264 |
| 5,565,104 | 10/1996 | Priegnitz | 210/659 |
| 5,635,072 | 6/1997 | Moran | 210/659 |

FOREIGN PATENT DOCUMENTS

WO 92/16274  10/1992  Germany ....................... B01D 15/02

OTHER PUBLICATIONS

"Liquid Column Chromatography as a Predictive Tool for Continuous Countercurrent Adsorptive Separations," *Ind. Eng. Chem. Process Des. Dev.*, vol. 15, No. 2, (1976), pp. 261–266.

"Performance of a Six–Port Simulated Moving–Bed Pilot Plant for Vapor–Phase Adsorption Separations," *Separation Science and Technology*, 27 (14), (1992), pp. 1889–1916.

"Preparative resolution of praziquantel enantiomers by simulated counter–current chromatography," *Journal of Chromatography*, 634 (1993), pp. 215–219.

"Optical resolution by simulated moving–bed adsorption technology," *Journal of Chromatography*, 590 (1992), pp. 113–117.

*Primary Examiner*—Walter D. Griffin
*Assistant Examiner*—Tam M. Nguyen
*Attorney, Agent, or Firm*—Thomas K. McBride; John F. Spears, Jr.

[57] ABSTRACT

Improved product purity is provided in a simulated moving bed adsorptive separation apparatus by flushing the stagnant volume of the feed valve and the transfer line connecting the feed valve to the rest of the apparatus. The invention adds another line for delivering recycle fluid as the flush stream to an additional inlet port on the feed valve. The apparatus comprises a number of serially connected adsorbent-containing chambers. The chambers are linked together with valving necessary to simulate the continuous countercurrent flow of the adsorbent and liquid phases.

6 Claims, 2 Drawing Sheets

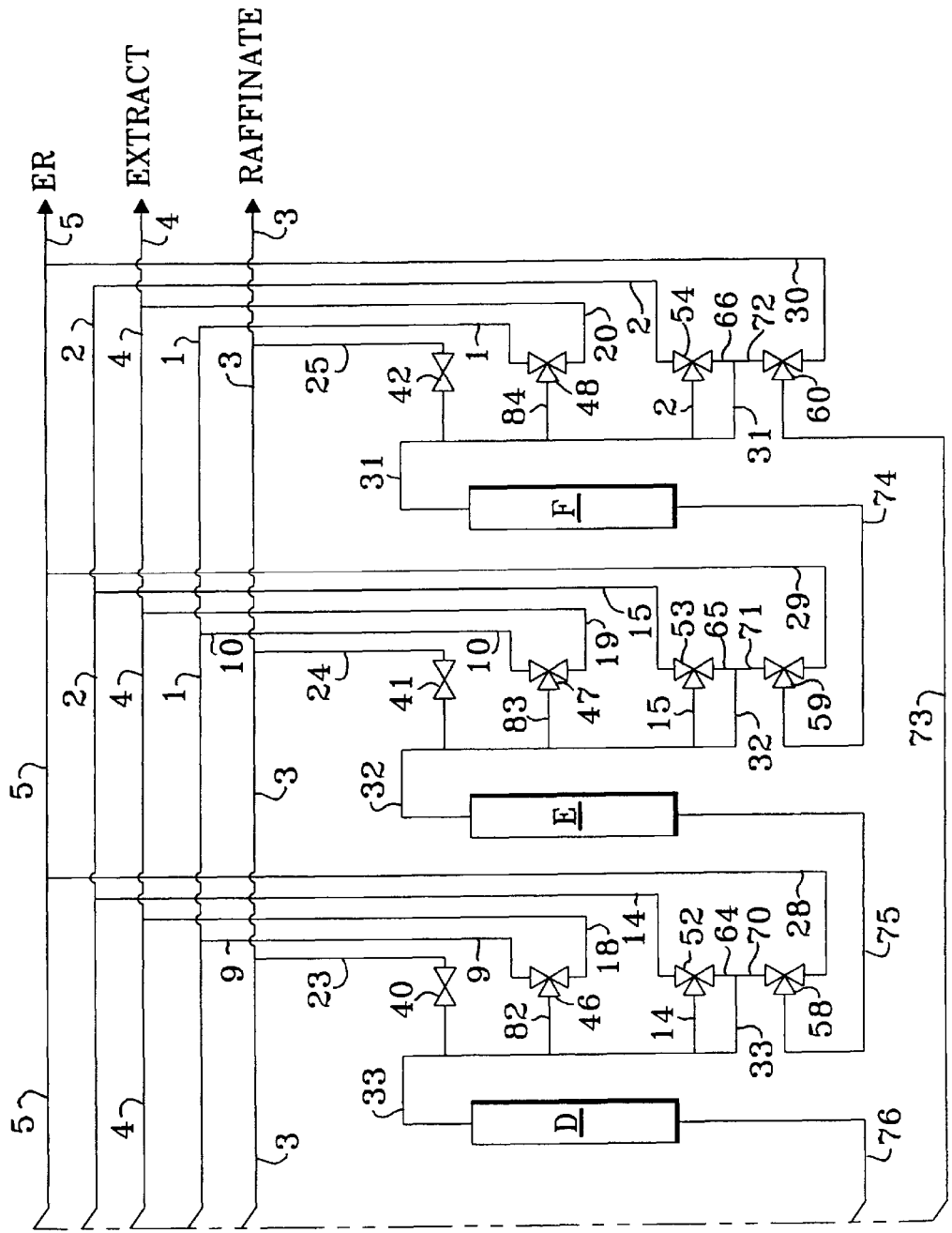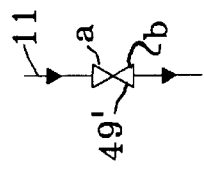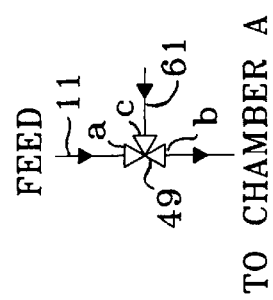

HIGH-PURITY SIMULATED MOVING BED ADSORPTIVE SEPARATION APPARATUS

FIELD OF THE INVENTION

The invention relates to a chromatographic apparatus for use in the small scale separation of chemicals such as chiral pharmaceuticals. The invention more specifically relates to a novel apparatus for performing a continuous adsorptive separation process in which the countercurrent movement of the adsorbent and various process streams is simulated.

RELATED ART

U.S. Pat. No. 3,706,812 issued to A. J. De Rosset and R. W. Neuzil describes a pilot plant scale simulated moving bed adsorptive separation process unit. This reference also describes an operational problem of such units when they are built in the manner of larger units and therefore include a "pump around" pump used to maintain liquid circulation in the process. The invention described in this reference is the utilization of a check valve at outlet end of each adsorbent bed to maintain unidirectional flow.

In an article appearing at page 261 of *Industrial and Engineering Chemistry, Process Design and Development*, Vol. 15, No. 2 (1976), a further description of this type of pilot plant is provided. This article also gives examples of the usage of the system and the chemical component profiles which are generated in the plant.

In an article appearing at pages 1889–1916 of *Separation Science and Technology*, Vol. 27, No. 14, (1992), there is illustrated the construction of a six— and twelve-bed simulated moving bed pilot plant using a number of multiport valves-instead of a single rotary valve. One valve is used for each of the inlet and outlet streams, including a desorbent effluent stream.

U.S. Pat. No. 4,434,051 issued to M. W. Golem describes an apparatus for performing a simulated moving bed adsorptive separation which employs a large number of multiport valves instead of a rotary valve as used in large scale simulated moving bed process units.

In an article published at pages 215–219 of the *Journal of Chromatography*, 634 (1993), there is shown an alternative valve arrangement for use on a simulated moving bed adsorptive separation pilot plant.

The separation of racemic mixtures of chiral material by continuous simulated moving bed adsorptive separation was described in a presentation conducted at PREP '91 in Arlington, Va., USA on May 13–15, 1991 and printed in the *Journal of Chromatography*, 590 (1992) pages 113–117. The article gives a diagram of a small scale system with eight adsorbent chambers and four rotary valves.

U.S. Pat. No. 3,268,605 illustrates a control system which may be used on simulated moving bed process units, with the flow rate of three of the main process streams being set by flow controllers and the flow of the last stream being set by a pressure control valve. A similar control philosophy as applied to a simulated moving bed system for chiral separations is shown in patent application WO 92/16274 assigned to Bayer Aktiengesellschraft. This reference employs a number of dual position valves to simulate the use of a moving bed of adsorbent.

U.S. Pat. No. 5,565,104 to J. W. Priegnitz and U.S. Pat. No. 5,635,072 to M. G. Moran illustrate other valving arrangements for small scale simulated moving bed adsorptive separation units.

BRIEF SUMMARY OF THE INVENTION

The invention is an apparatus for performing a simulated moving bed adsorptive separation process. The subject invention has a number of benefits compared to the prior art when applied to pharmaceutical separations or other separations requiring a high degree of product purity. The subject invention utilizes a feed stream valve arrangement which increases the purity of the products. This feed arrangement employs a feed valve having two inlet ports, with one of the ports receiving circulating liquid from upstream in the apparatus through an added transfer line. This flushes fluid which could otherwise contaminate the desired product from the feed valve and the line connecting the feed valve to the rest of the unit.

One broad embodiment of the invention may be characterized as an apparatus for performing a continuous simulated countercurrent moving bed chromatographic separation of a mixture of two or more chemical compounds, the apparatus comprising a plurality of individual adsorbent chambers containing a bed of adsorbent, a plurality of fluid transfer lines interconnecting the adsorbent chambers and providing means for passing feed and desorbent streams into the apparatus and removing extract and raffinate streams from the apparatus, a plurality of valves for controlling the flow of fluids through the fluid transfer lines and adsorbent chambers, with a separate set of four valves being associated with each adsorbent chamber; with the valves of each set being characterized in that two ports of the valve which controls the flow of the feed stream into a specific individual adsorbent chamber are connected to the fluid transfer line which interconnects this individual adsorbent chamber with a next upstream adsorbent chamber, whereby fluid discharged from the next upstream adsorbent chamber may flow through the valve and flush the feed stream material from the valve and from a conduit leading from this valve to this specific adsorbent chamber.

BRIEF DESCRIPTION OF THE DRAWING

FIG. 2A illustrates the prior art. FIG. 2B illustrates the present invention interconnection of a feed inlet valve 49.

DETAILED DESCRIPTION AND PREFERRED EMBODIMENTS

Figure 1A:
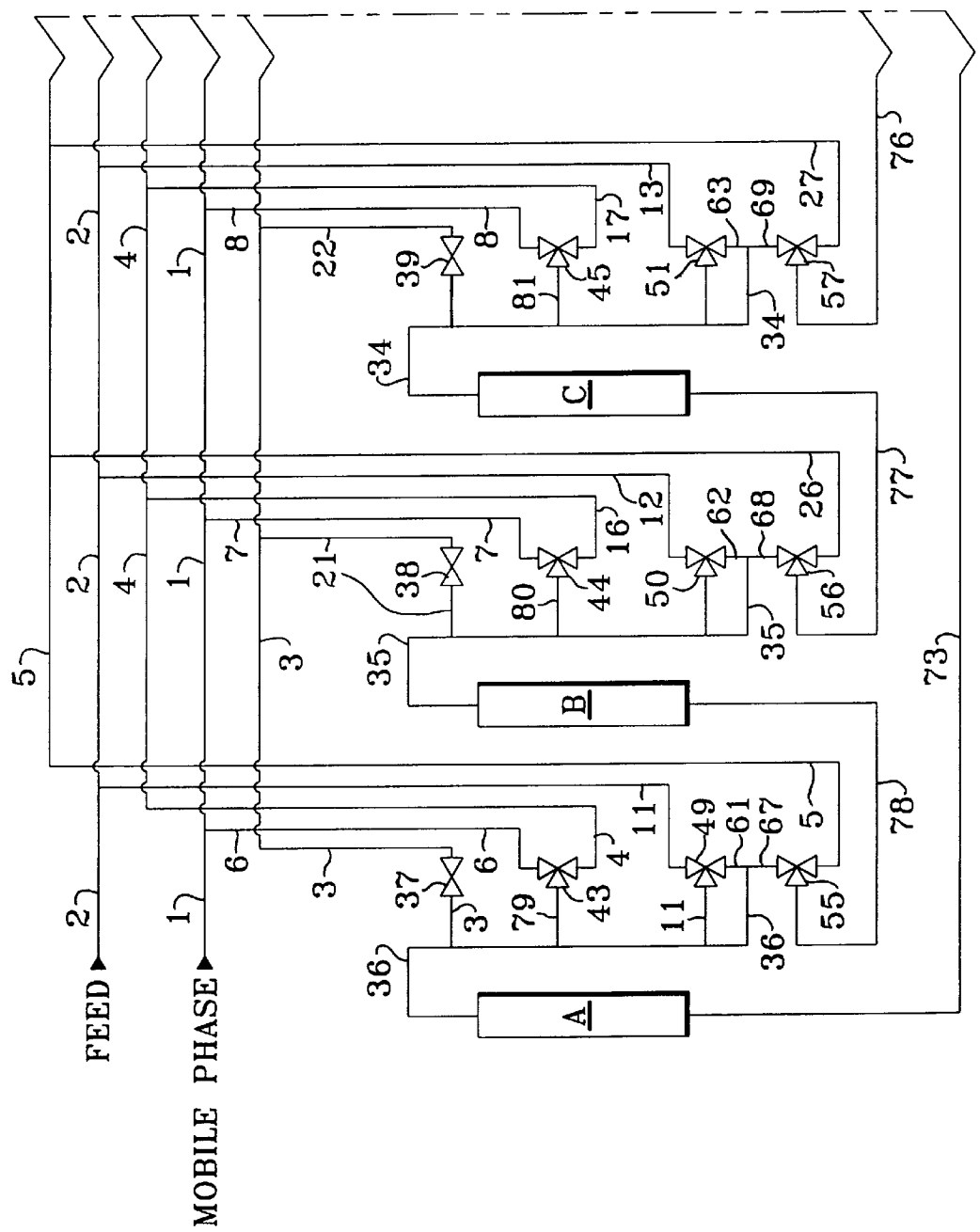
FIG. 1 is a simplified diagram of an apparatus built according to the subject invention and employed for the adsorptive separation of hydrocarbons through the use of simulated countercurrent liquid-adsorbent flow in the six adsorbent chambers A–F.

Simulated moving bed adsorptive separation is used commercially in a number of industries to perform useful separations of a variety of chemicals including petrochemical intermediates. It is established as a leading industrial process for the recovery of para xylene suitable for the production of polyesters. It is also a leading process for the recovery of normal paraffins used in the production of linear olefins which are then consumed as detergent precursors. Adsorptive separation is also being investigated as a tool in the separations of a wide variety of chemicals including chiral compounds and intermediates used in the production of experimental and therapeutic drugs. These efforts are normally conducted in small scale pilot plants which do not require much feed stock, adsorbent or plant space. This is especially true when the materials which are to be separated are expensive due to their rarity or complicated production techniques.

Although the general theory and operation of a simulated countercurrent moving bed (SMB) unit does not change as its design feed rate is decreased, pilot plant scale simulated moving bed adsorptive separation units have unique problems compare to industrial scale plants. Many of these problems are related to the higher level of product purity required for pharmaceuticals, the higher pressures used in HPLC and other factors specific to a separation rather than the overall SMB process. For instance, SMB pilot plants have been troubled by a need to achieve very high levels of separation between chiral compounds which have different pharmaceutical effects.

The pharmaceutical industry requires very high levels of purity and therefore cannot tolerate backmixing of feed and product components in the mechanical arrangement used for simulating moving bed chromatographic separations. Specifically, transfer lines should not commingle streams by transporting both the feed and the effluent streams and valve leakage must be minimized compared to common petrochemical separations. It is a primary objective of the invention to provide an apparatus for performing simulated moving bed separations which is capable of producing very high purity products.

The subject invention achieves these objectives by the use of a unique flow scheme that replaces the conventional on-off (two-way) feed valve with a three-way valve and employs an additional novel conduit. The invention is premised on the recognition that at least some of the purity problems of prior SMB systems is the result of feed components located in a small "stagnant" feed delivery line slowly blending into the fluid circulating in the apparatus. Specifically, there is a short section of line located between the transfer line carrying the circulating fluid and the feed stream flow control valve. This line is not part of any circulation flow path of the prior art apparatus. When the feed stream is not being charged to the process, this feed line is stagnant. It was assumed the feed remaining in this section of line did not admix with the circulating fluid in the line to which the feed line connects. It is now felt that there is indeed some continuous admixture at the junction of these two lines which tends to slowly leak both extract and raffinate compounds into the circulating fluid.

The turbulence which occurs at the junction between this feed delivery line and line carrying the fluids circulating in the process results in the feed in the "stagnant" line being slowly admixed into the circulating process stream. Certain process-related restraints dictate that it is preferred to locate the junction of the feed delivery and process lines upstream of the similar junction at which the extract and raffinate streams are withdrawn. Therefore for at least part of a cycle, a small amount of feed is admixed directly into the extract and raffinate streams. While this is a very small quantity of feed components, this admixture occurs at each feed delivery line; that is, at each adsorbent chamber. The feed stream may also be more concentrated than the extract or product streams. It is believed this is sufficient to cause product purity reductions on the order of onetenth of one percent, e.g., from 99.9 to 99.8 percent. This level of purity reduction is significant in pharmaceutical production.

The main mobile phase flow cannot be used to flush the feed line since it enters the process at a separate point from the feed stream. While it is possible to provide an external system to flush this line section, as with added mobile phase liquid, this complicates the apparatus by requiring an additional valve and another externally-connected transfer line for each adsorbent chamber.

The invention was tested in a small scale system having capillary-like process lines. The small diameter of these lines originally made it appear backmixing at the junction of these lines would not be a problem. Surprisingly, the tests show flushing the small feed delivery lines improves product purity. It is expected that the improvement provided by the invention will increase as the line size increases. For instance the "large scale" pharmaceutical SMB units may employ conduits of about 1 cm diameter.

In the simulated moving bed technique, the normal chromatographic profiles which develop as a multicomponent feed mixture passes through a lengthy bed of adsorbent is in effect frozen in place by the periodic advancement in the location of the addition and withdrawal points of the feed, desorbent, extract and raffinate streams. A shift of the feed and withdrawal points in the direction of fluid flow simulates movement of solids in the opposite direction. Liquid flow direction defines the "downstream" direction in the apparatus of the invention and establishes a reference point for use in the following description.

As used herein several terms have specific meanings. The term "rich" is intended to indicate a concentration of the indicated compound or class of compounds greater than 50 mole percent. The concentration of a desired species in the extract or raffinate streams may however not satisfy this definition. While in a unit devoted to the production of traditional petrochemicals the product stream may be quite concentrated, the extract product stream of a pharmaceutical separation may contain only two percent of a desired chiral compound with much of the stream being mobile phase (solvent). This extract product stream would have a much higher relative concentration of the desired product than the feed. That is, a racemic mixture can be separated such that a high-purity extract stream would contain only a few percent of the desired chiral isomer.

The term "multiport valve" is intended to refer to a valve which has ports for connecting a single primary process stream transfer line to two or three different process stream transfer lines and for allowing selective flow between any one of the different transfer lines and the primary transfer line. A three-way ball valve is an example of a multiport valve. The term "header" is used to indicate one of the primary transfer lines used to pass a primary process stream into the overall process or to remove a primary process stream from the overall process. The primary process streams are the feed stream, desorbent (mobile phase) stream, raffinate stream and extract stream. The extract recycle stream of this invention is also considered a primary process stream. The extract recycle stream of this invention is also considered a primary process stream.

The overall process flow of the subject invention can be best described by reference to the Drawing. The Drawing is a simplified flow diagram of an embodiment of the invention employing six adsorbent beds or chambers labeled "A" through "F".

The number of adsorbent chambers may vary between different configurations to suit the situation. Most embodiments of the apparatus will have eight or more chambers, with twenty-four being about the maximum practical number of chambers. Six chambers are shown on the drawing basically for ease of presentation and description. This description and the drawing are premised on the adsorbent chambers each containing a single bed of adsorbent. This is not a requirement as the adsorbent can be distributed between several beds within a single chamber. Alternatively, the adsorbent can be a coating on the walls of a small diameter chamber. As yet another variation, a fluid transfer point could contact to an intermediate point on the cylindrical chambers to allow the process streams to enter a single chamber at more than one point. This alternative is not preferred.

The zone numbers used in this description of this simulated countercurrent moving bed process are those which have become established in the art. They are used and illustrated in U.S. Pat. Nos. 2,985,589; 3,310,486; 3,392,113 and 4,475,954 which are incorporated herein by reference for their description of the operation of this process and equipment for its performance. The number of chambers in any one zone of the apparatus depends on such factors as adsorbent performance, desorbent strength, etc.

The beds are serially interconnected by a circuit of conduits and valves in a manner described in more detail below. This interconnection forms a loop containing all of the beds, with points to add and remove the primary process streams between each bed located at regular intervals along the loop. The location of various zones used in the separation process, such as the adsorption zone, moves around the loop. The adsorbent is stationary.

Assume the feed stream enters chamber "B" and then flows downstream into chamber "A". The separation which occurs while the feed stream passes through the adsorbent retained in chambers "B" and "A" results in the formation of a raffinate stream having a higher concentration, relative to the feed stream, of one or more component(s) originally present in the feed stream, components which are less strongly held by the adsorbent. Often, but not necessarily, the most strongly adsorbed component is the desired product. Adsorption of this component leaves the raffinate stream comprising the less strongly held component(s) and admixed desorbent material which is withdrawn from the adsorption zone. A back-pressure valve or regulator is preferably used as the device which regulates the flow rate of the raffinate stream out of the process via the raffinate header line. The raffinate flow rate is preferably not really set by this valve. Preferably the valve's primary function is to maintain a constant pressure at this point in the system. The flow rate is actually set by the flow rates of the other streams.

The following is a more detailed description of the layout of the apparatus and the flows through the apparatus at one particular point in time. When the apparatus is being used to simulate a countercurrent movement of the adsorbent versus the liquid, valves will be opened or closed by a computerized control system which periodically advances the inlet points to each zone one chamber. To simulate countercurrent flow in the depicted apparatus this advancement is to the left. The flow of the four basic streams of the process will therefore move through different lines and valves at different points in time. Each stream flows through each section of the apparatus in a similar manner during every cycle.

It is important to note that the flow of liquid through the various lines is primarily determined by the valve(s) which are open. The great majority of the valves depicted in the drawing as being located near the inlet of the chambers are in a totally closed position at any one time. In contrast, the valves depicted in the drawing as being associated with the outlets of the chambers; that is, valves 55 through 60 are normally in an open position except for one valve when an optional "recycle" stream is not being recovered.

FIG. 1 illustrates the transfer lines, adsorbent chambers and valves employed in an apparatus containing six adsorbent chambers. The lines between chambers "C" and "D" in the middle of the apparatus are zigzagged to represent that other adsorbent chambers, transfer lines and associated sets of valves could be present at this location in the apparatus to increase the number of adsorbent chambers as desired. For purposes of presentation in the limited confines of one sheet of drawing, the depiction of the apparatus is however limited to the six adsorbent chambers of FIG. 1. The numbering system employed in the figure normally assigns a new character or number after each branching of a line. However, certain lines which continue through the apparatus, such as the header lines, have a single number despite lines branching off of it. This is in conformity with the standard practice of referring to a header line as a uniform whole extending through a system. In a like manner, the lines acting as header lines leading into the adsorbent chamber from the valves, such as line 36, are treated as header lines and have a single number. Further, if a single line passes through a valve which mainly serves to stop the flow of liquid in the line then the line number continues on the other side of the valve. This protocol reduces the number of characters required in the description and is believed to increase the clarity of the description. The nomenclature of the components of the apparatus and the reference characters for each is set out in Table 1.

TABLE 1

| | |
|---|---|
| 1 | mobile phase header |
| 2 | feed header |
| 3 | raffinate header |
| 4 | extract header |
| 5 | (extract) recycle header |
| 6–10 | mobile phase feed lines |
| 11–15 | feed stream feed lines |
| 16–20 | extract stream withdrawal line |
| 21–25 | raffinate stream withdrawal line |
| 26–30 | recycle stream withdrawal line |
| 31–36 | chamber inlet line |
| 37–42 | raffinate valve - two-way |
| 43–48 | mobile phase/extract valve - three-way |
| 49–54 | feed valve - three-way |
| 55–60 | recycle valve - three-way |
| 61–66 | feed valve flush line |
| 67–72 | recycle valve outlet line |
| 73–78 | chamber outlet line |
| 79–84 | inlet line branch line |

Referring now to FIG. 1, the multicomponent feed stream being processed in the apparatus enters on the left side through the feed header line 2. The feed header line continues over to the right-hand side of the apparatus leading to chamber "F". A number of feed stream feed lines 11 through 15 drop down from the header line to carry the feed stream to the individual adsorbent chambers. The feed stream feed lines include the terminal feed delivery line, described above, located downstream of the feed valve. While the flow of the feed stream through line 2 will be substantially continuous, there is flow through only one of the feed stream feed lines (11–15) at any point of time during operation of the apparatus. This is because feed is only passing into the entrance of one of the adsorbent chambers at any point in time during a cycle of operation. In a very similar manner, a mobile phase stream, which is also referred to herein as a desorbent stream, is simultaneously charged to the apparatus via line 1. Line 1 also extends to the right-hand side of the apparatus with the terminal portion of header line 1 acting as the mobile phase delivery line to chamber "F". Individual mobile phase feed lines 6–10 branch off of the mobile phase header line 1 and deliver the mobile phase to one of the other individual adsorbent chambers "A" through "F". As with the feed stream, the mobile phase flows through the header line will be substantially continuous. However, the mobile phase only flows through one of the feed lines 6–10 (or the end of the mobile phase header line) at any one point of time during the operation of the process.

The point at which the feed stream enters an adsorbent chamber marks the beginning of the adsorption zone or Zone I. Zone I continues to the point at which the remaining components of the feed stream are withdrawn as the raffinate stream. The point at which the mobile phase (desorbent) enters an adsorbent chamber marks the beginning and upstream end of the desorption zone or Zone III. Zone II is a purification zone between the point at which the extract stream is removed and the feed stream is passed into the apparatus. Zone IV separates the adsorption and desorption zone and lies between the raffinate withdrawal point and the mobile phase injection point.

As an example of this zone nomenclature, if the apparatus comprises 16 adsorbent chambers, referred to as chambers "A" through "P", a feed stream may be charged to the inlet of adsorbent chamber "H" and passed through 6 adsorbent chambers before being removed from the apparatus at the outlet of adsorbent chamber "C" as the raffinate stream withdrawn from the apparatus. In this same example, the mobile phase or desorbent stream can be charged to the inlet of adsorbent chamber "A" with the resultant extract stream being removed from the outlet of adsorbent chamber "O", with this forming an extraction zone or Zone III of the apparatus comprising 3 adsorbent beds. In this specific example, an external recycle stream could be withdrawn from the outlet of adsorbent chamber "B" located one chamber downstream from the point of removal of the raffinate.

In the specific case of FIG. 1, at the point in time being described the feed stream from the header line 2 flows downward through the feed line 11 into the feed valve 49 associated with adsorbent chamber "A". With the three-way feed valve 49 being in an open position, the feed stream will emerge from the valve and continue to flow through the terminal portion of line 11 to the junction with the chamber inlet line 36. Purging this terminal portion is the key to the subject apparatus. The feed stream will then flow upward through line 36 to the inlet of adsorbent chamber "A" which is at the top of the chamber as illustrated in the Drawing. The feed stream enters the adsorbent chamber "A" and the actual adsorptive separation begins. The different components of the feed stream are retained at different rates by the adsorbent with some components such as solvent components being essentially unretarded. The components of the feed stream are therefore separated such that the different components have different concentration profiles in the stream flowing through the adsorbent chamber. The thus partially fractionated feed stream emerges from the bottom of the adsorbent chamber "A" and is carried by the chamber outlet line 73 to the inlet port of the three-way recycle valve 60 of chamber "F". This three-port valve allows the withdrawal at specific points in time of a small quantity of liquid referred to herein as external recycle. This liquid is basically high-purity solvent or mobile phase material which is trapped in a "dead bed" of the system during operation and is withdrawn for recovery. The optional external recycle flow is therefore a pulse collected once during each change in the position of the valves used in the apparatus. The external recycle material is collected for reuse in the process if this is allowed by the procedures which govern the operation of the system. For instance, in pharmaceutical separations the external recycle may be contaminated and possibly cannot be reused; while in the separation of fine chemicals or nonmedicinal chiral compounds, the external recycle probably could be reused as mobile phase material.

The fluid stream removed from adsorbent chamber "A" 10 through line 73 passes through the recycle valve 60 into the recycle valve outlet line 72 and is divided into two separate portions. The major portion flows into the adsorbent chamber inlet line 31 and a smaller portion flows through the feed valve flush line 66. The portion of the circulating liquid flowing through line 66 pushes any residual feed stream material from the internal volume of the feed valve 54 and from the small delivery section of feed line 2 between the feed valve 54 and chamber inlet line 31. Alternatively, a small portion of the fluid otherwise removed as the external recycle may be allowed to flush valve 54 and feed line 31. The advantage of this would be that the line between the valve and chamber inlet line 31 will then be filled with mobile phase liquid and neither extract nor raffinate compounds would be subsequently admixed into the component profiles which had been partially developed in the preceding adsorbent chamber. The material flowing through the feed inlet valve for the purposes of flushing the valve and the feed line is admixed with the rest of the material flowing through line 31 and continues to the inlet of the adsorbent chamber "F".

It is to be noted that at this point in time the other valves in each set of valves for adsorbent chambers "A" and "F" are in a closed position such that other fluids are not withdrawn or passed into the apparatus through any valve in either set of valves.

The feed valve associated with a particular adsorbent chamber is always positioned to be open to receive flush fluid except for the short period of time during which feed is flowing through the valve. Thus the valve and the delivery section of the feed stream line contain fluid having the same composition as that flowing past the junction of the feed stream line with the chamber inlet line.

Two options exist for the operation of the feed valve after sufficient fluid has been passed through it to completely flush the feed line. First as set out above the valve may be allowed to stay in this position with fluid from line 73 continuing to flow through both lines 66 and 31 until feed again enters through valve 54. This is highly preferred. Alternatively, the valve may be moved to block the flow through line 66 at some time before it is required to move the valve to allow the feed stream to enter the apparatus.

As the process stream continues to flow through adsorbent chamber "F", the compounds are further separated to produce a more defined set of concentration profiles in the flowing liquid. The effluent of the adsorbent chamber "F" is removed in the chamber outlet line 74 and passed into the recycle valve 59. The recycle valve 59 is open and allows all the fluid to travel into outlet line 71. One portion of the fluid then flows into the chamber inlet line 32 and passes upward in the figure. As previously described a second portion flows through line 65 and valve 53, which directs into the terminal delivery section of line 15. The two portions then rejoin and flow through line 32. Prior to reaching the inlet of adsorbent chamber "E", the fluid is removed through the raffinate withdrawal line 24. The fluid being removed in this manner basically comprises the less readily retained component(s) of the feed stream and any associated solvent component(s). The raffinate stream passes through the open two-port raffinate valve 41 and continues through the raffinate stream withdrawal line 24 to the junction with the raffinate header line 3. The raffinate stream is then removed from the right-hand end of the Figure through header line 3. At this point in time, two of the four valves in this set of valves associated with adsorbent chamber "E", that is, valves 47 and 53, are in a closed position and there is no flow through these valves other than flush liquid in valve 53. Adsorbent chambers "A" and "F" therefore form the adsorption zone or Zone I of the subject separation process at this point in time. When the valves 'index' the adsorption zone will become chambers "A" and "B".

While it is highly unusual in a real unit, for purposes of description of the apparatus, it is assumed that the desorption zone, or Zone III of the process, is formed by the single adsorbent chamber "C". Accordingly, the mobile phase stream charged to the overall apparatus through the header line 1 continues downward through the mobile phase feed line 8 into the three-port (three-way) mobile phase extract valve 45. A second open port on this valve allows the mobile phase to flow into the inlet line branch line 81 and then into the chamber inlet line 34. Line 34 delivers the incoming mobile phase stream to the top or inlet of the adsorbent chamber "C". The component or components of the mobile phase stream carried by line 34 releases the retained extract component of the feed stream from the adsorbent material located in chamber "C". This causes the formation of a stream comprising an admixture of the mobile phase and the previously retained component(s) of the feed stream, which is discharged from the outlet of adsorbent chamber "C" through the chamber outlet line 77. This mixed component stream, which will become the extract stream of the overall process, is passed into an open port of the recycle valve 56 and then into the recycle valve outlet line 68. It is then passed into a portion of the chamber inlet line 35 associated with chamber "B". At this point in time, the recycle valve 55 is in an open position flow and there is flow into the adsorbent chamber "B". However, valve 44 is also in an open position at this time which allows a portion of the flow in line 35 to flow through this valve and into the extract stream withdrawal line 16. The extract stream therefore flows into the inlet line branch line 80 which carries the extract stream to the mobile phase extract valve 44. The withdrawal line 16 carries this material which is now the extract stream to the extract header line 4 through which the extract stream is carried to the right-hand side of the depiction of the apparatus. The remaining portion of the liquid in line 35 flows into chamber "B". The flows and positions of the valves will differ at other points in time during the cycle as each adjacent pair of chambers forms the adsorption zone.

FIG. 1 also illustrates the pattern, in which the components of the apparatus are arranged. Each adsorbent chamber has associated therewith a chamber inlet line 31–36 and a chamber outlet line 73–78. Also associated with each specific chamber is a set of four valves comprising three three-way valves and one two-way valve. These valves may also be described as three-port and two-port valves, with the two-port valve basically being an on-off valve. The three-way or three-port valves allow the central or common conduit to be selectively connected to either of the remaining two ports. In the Drawing, the two-way valves are raffinate valves 37 through 42. The three-port valves include the mobile phase/extract valves 43–48, the feed valves 49–54 and the recycle valves 55–60.

FIG. 2A illustrates the prior art feed valve 49' and FIG. 2B illustrates a feed valve 49 of the subject invention. In the prior art valve 49', only a two-port valve is used. The feed stream is brought to the valve in line 11 and flows through the valve only when it is in the open position. This is the only flow through the valve. The outlet line is stagnant when there is no flow of feed through this valve. In the valve arrangement employed in the subject invention, line 11 still brings the feed stream to the valve and the feed stream still flows through the valve only when the valve is positioned to connect port "A" to the outlet port "B". However, when the feed stream is not allowed to flow through line 49, port "C" is opened to port "B" allowing flush fluid from line 61 to flow through the valve and into the continuation of line 11 leading to the adsorbent chamber. The fluid flowing through line 61 may be either the external recycle material otherwise removed through header line 5 or the variable composition process stream normally flowing through the serially interconnected adsorbent chambers.

From examination of FIG. 1, it may be seen that the arrangement as depicted in FIG. 2B is equivalent to having two separate ports of feed valve 49 connected to the chamber inlet line, e.g., line 36. The division of the fluid flow between the two lines, such as line 36 and line 61, will be set by the relative pressure drops in these two fluid circuits. The relative pressure is set to ensure a flow of the flush liquid through the feed valve.

To simplify the control system and operating procedures of the invention, it is preferred that the feed valve 49 is left with the ports "B" and "C" in open communication such that the valve is being flushed at all times except when the feed stream is being charged into the apparatus through line 49. That is, it is preferred that the valve is not flushed for some short period of time and then totally closed to fluid flow. This latter mode of operation would involve another step in the sequencing of the valves and is therefore preferably omitted. However, it could be employed if desired for instance if the division of the fluid flow between the two conduits was found to create an undesired disruption of the concentration profiles established in the circulating liquid or for some other reason.

The flow rates of the feed stream, desorbent stream and extract stream are all regulated on the basis of set flow rates, which are preferably held constant. The raffinate stream rate is on pressure control. A flow rate control valve (not shown) regulates the effluent rate of the extract stream of header line 4 to be less than the feed rate of the desorbent stream of header line 1. The outlet rate of the raffinate stream is set by a pressure control valve also not shown. The rate of flow of the raffinate is therefore automatically equal to the two input streams minus the extract stream.

During the point in time being described, a portion of the extract material flowing through the chamber inlet (e.g., line 36 as described above) line equal to the difference between the desorbent and extract stream flow rates is charged to the inlet of the purification zone (Zone II) and is referred to in the art as Zone II material. The function of the liquid flowing through this zone is remove raffinate material from the nonselective pore volume of the adsorbent and chambers of the purification zone. This material flows through any interconnecting lines leading into the inlet of the next adsorbent chamber. The liquid may flow through two or more adsorbent chambers. It then joins the feed material and flows into the inlet of the first chamber of the adsorption zone (Zone I). The raffinate material flushed from the purification zone therefore flows into the adsorption zone. The raffinate components in the material being flushed into the adsorption zone in this manner merely travel through the adsorption zone and do not interfere with the adsorption of the desired component from the feed stream.

At the other end of the sequence, a portion of the raffinate stream may be allowed to flow into the upper end of an adsorbent chamber instead of being withdrawn to a header line. This is done in order to displace the liquid present in the adsorbent chamber. This adsorbent chamber is the adsorbent chamber which had received the pure desorbent material in the previous step. At the end of that step, the liquid in the chamber is comprised of essentially 100% desorbent material. This optional displacement step performed by feeding raffinate material into the top of the adsorbent chamber, also referred to herein as the "dead bed" is done to recover this desorbent material as the "external recycle" stream. The displaced desorbent exits the bottom or outlet of adsorbent chamber and is directed into the external recycle header 5. The displaced fluid is removed from the apparatus as the external recycle.

A valve (not shown) controlling the flow of the external recycle stream in line 5 may be employed in conjunction with an optional on-line analytical device (also not shown) to recover the high-purity desorbent in this stream. Normally the flow of the raffinate material through the dead bed would be controlled at a set rate and for a set time which will result in an optimum recovery of high-purity desorbent. However, the analytical instrument could monitor the composition of the material flowing in a line or entering a valve and control the external recycle flow based upon this measurement. The high purity desorbent may be collected and/or recycled. Material which is contaminated, that is, a mixture of desorbent and raffinate, may be diverted in response to the analytical device to the raffinate header or other raffinate collection system such as a storage tank.

This flushing of the dead bed allows the recovery of valuable desorbent material. It has no detrimental effect on the separatory performance of the process as it merely results in the adsorbent chamber being loaded with a mixture of desorbent and raffinate components. In the next step in the process the adsorbent chamber becomes a second bed in Zone I, the adsorption zone. The adsorbent still functions in the normal manner, and the contents of the chamber flows into the raffinate stream.

The apparatus does not employ a pumparound stream as utilized in the original simulated moving bed countercurrent process technology. This simplifies the process, reduces the amount of line volume in the apparatus, and results in a generally improved apparatus.

It is preferred to employ "pressure-pairing" whenever two main process streams flow through the same multiport. By pressure pairing it is meant that the header line streams are held at different pressures and then paired together such that any leakage does not cause harmful contamination of the desired product. In the present case the four streams are maintained at different pressures with the mobile phase (desorbent) always being at the highest pressure. The extract stream has the next highest pressure. This ensures that the extract purity will always be free of contamination by a raffinate component.

While the pairing of the streams on the valves should by itself prevent some admixture possibilities, such as mobile phase and extract, the pressure cascade will have the same effect. For instance, any leakage of mobile phase into the extract would merely dilute the extract, and any leakage between the extract and the remaining two streams would be in the form of extract flowing into the feed or raffinate. While this can reduce the extract recovery rate, it will not reduce the purity of the extract product. It is also desired to have the feed pressure greater than the raffinate stream pressure. The preferred order of pressures is therefore mobile phase>extract>feed>raffinate. These same advantages are obtainable when the raffinate is the intended product.

Admittedly some of the pressure cascade sequence is set by the equipment arrangement and operation necessities of the equipment. For instance, the pressure of the mobile phase must be greater than the extract since the mobile phase pushes the extract out of the system. Likewise the feed stream inlet pressure must be greater than the raffinate outlet pressure as the feed pushes the raffinate through the system.

The second element of the preferred pressure pairing technique matches one feed and one effluent stream to a multiport valve which handles input and output for a specific adsorbent chamber.

The subject invention leads to higher purity products in several different ways. In addition to this "pressure pairing", the physical layout of the apparatus eliminates the unflushed conduit and fitting volume which carry both the intended product and a stream containing compounds which would be a contaminant in the product. The invention allows these lines to be exposed to fluid flow which will tend to help flush them.

While this description of the figures was presented on the basis of all the flows through the adsorbent beds being in a downward direction, there is no inherent requirement for this to be so. The flow through the adsorbent beds may be in an upward direction or in a combination of upward and downward directions in different beds.

As previously stated, there is preferably no direct control on the rate of flow of the raffinate stream. The flow rate of this stream is set by the rate of flow of the two streams into the process, namely, the feed and desorbent streams and the controlled rate of flow of the extract stream which leaves the process.

All but one of the recycle valves (55–60) associated with the outlet of the adsorbent chambers normally have their ports open to fluid flow at all times during the use of the apparatus. One valve is in a position which prevents flow through its ports to the next bed. The location of this one blocked port is stepped through the adsorbent beds in coordination with the stepping of the other valves, in a manner which maintains unidirectional flow through the apparatus. This flow control through the indexing of the valves eliminates the need for a check valve in a line associated with each chamber to provide unidirectional flow. This is another advantage to the subject apparatus, especially when applied to high purity separations such as pharmaceuticals.

It must be noted that the previously described "dead bed" nomenclature could be misleading. The withdrawal of this external recycle stream, which has a reduced flow rate compared to the main streams, does induce some flow through the otherwise stagnant dead bed chamber. The withdrawal of this stream is optional. The desire to recover this desorbent for reuse increases with the size and length of operation of a specific apparatus. That is, as the total recoverable volume of desorbent in the chamber increases the use of this technique becomes more desirable. Other factors relevant to the desirability of recovering this external desorbent recycle stream include the cost of the desorbent and the difficulty of recovering desorbent from the collected raffinate and extract. The collected raffinate and extract will contain some desorbent and failure to withdraw the desorbent increases the amount of desorbent in the raffinate.

The use of the dead bed and the recovery of mobile phase liquid from this bed has the subtle benefit of making the Zone I operation more efficient. This is because the adsorption profiles which exist in the system are allowed to move further downstream, with part of the profile entering the dead bed. The effect is equivalent to using a bigger Zone I.

The Drawing is only intended to explain the invention by illustrating one preferred embodiment. Many variations departing from the apparatus depicted in the drawing are possible. For instance, it will be readily recognized by those skilled in the art that the flow of the main process or header streams, that is the feed, desorbent, extract and raffinate streams, can be controlled in a number of different ways. The use of pumps to set the rate of three streams is but one example. While it is desired to control the flow rate of all main process streams, it is also desired to only employ one pressure control valve. One method of flow control which conforms to these preferences is to employ a pressure control valve on the external recycle and flow control on the major process (header) lines. An example which departs from these preferences would be the use of flow control valves on the two outlet streams or pressure control valves on the inlet streams or some combination of these valves. The depiction of the valves on the drawing should not be viewed as controlling the type of valve which may be used. For instance a multiport valve having a common feed port and four outlet ports can be used as a three-port valve. In this instance two of the ports would always be closed. Valve selection is primarily a matter of performance, availability and price versus design specifications.

The feed and desorbent streams will normally be fed to the unit by pumps from small tanks located close to the unit. The raffinate and extract streams will normally be collected in similar tanks located close to the unit. Both the raffinate and/or extract streams may be sent to thin film evaporators, fractional distillation zones or crystallizers or other facilities to recover solvent, the intended product and other compounds. The stream containing the undesired compound may be sent to a conversion zone such as an isomerization or racemization zone to produce more of the desired product and then recycled as feed.

There are a number of factors which remain constant during use of the invention such as a chosen mechanical configuration and the sequence in which the streams flow to and from the chambers. This sequence, in a downstream direction, is desorbent, extract, feed and raffinate, which sets the preferred cascade of relative pressures. The step time will normally remain constant during a run but may be varied to adjust performance. Other factors may be varied during use of the invention. The real variables are the number of beds assigned to each zone; e.g., adsorption or desorption, the step time and the flow rate of three of the process streams. The flow rates of the feed, desorbent and extract streams are preferably controlled and hence variable. The flow rate of the raffinate may vary but is really dependent on control of the other three streams.

The adsorbent particles may be in the form of any shape, e.g., sphere or monolith, and of any size suitable for use in high pressure liquid chromatography. The composition of the adsorbent is not a controlling factor in the invention, which may employ any suitable solid adsorbent.

All of the chambers will contain the same adsorbent which may be a commercially available adsorbent. The adsorbent chambers may be purchased filled with the adsorbent or the adsorbent(s) may be loaded separately. Examples of suitable adsorbent material include the cross-linked organic resins, natural or synthetic zeolites including zeolites X, Y, L, ZSM, Beta and omega, silica, silica-alumina, the various adsorptive aluminas, pillared and mesoporous materials including pillared clays, and nonzeolitic molecular sieves (NZMS), such as silica alumino-phosphates and aluminophosphates, and chiral stationary phases. Chiral stationary phases are described in U.S. Pat. Nos. 5,254,258 and 5,290,440. Further information on the separation of chiral compounds may be obtained from U.S. Pat. No. 5,518,625 which is incorporated herein by reference.

The mobile phase or desorbent may be any compound or mixture of compounds which is the desired phase at the chosen operating conditions, does not react with either the adsorbent or the compounds being separated and is tolerable or totally separable from the intended products. The desorbent may contain a chiral moiety. Depending on the compounds being separated the desorbent may comprise water, ethanol, methanol, benzene, toluene, a dialkylbenzene or a halogenated hydrocarbon.

The subject apparatus can be constructed from commercially available components. The adsorbent modules or chambers are preferably standard HPLC tubes but may be much larger. Suitable valves and actuators are available commercially. The conduits and connectors may be of standard design for pilot scale pharmaceutical plants or HPLC instruments used for the desired separation in the relevant industry.

The valves can be mechanically linked such that they are all indexed simultaneously by a single drive mechanism. However, it is preferred that a separate electrical or air-powered actuator is provided for each valve. This allows the relative position of the feed and withdrawal points to be adjusted as desired to thereby adjust the number of adsorbent chambers in the different zones, e.g., adsorption used in the process. An electrical system which provides a means to monitor valve position is preferred.

A preferred embodiment of the subject invention can accordingly be characterized as an apparatus for performing a continuous countercurrent moving bed high pressure liquid chromatographic separation of a multicomponent feedstream which comprises a plurality of serially interconnected adsorbent chambers with each adsorbent chamber having an inlet and an outlet on opposite ends of the chamber and adapted to contain a quantity of a selective adsorbent; a feed stream header line; a desorbent stream header line; a raffinate stream header line; an extract stream header line; a set of valves for each adsorbent chamber, with each set of valves comprising a first valve which controls the flow of a raffinate stream from the apparatus; a second valve which controls the flow of both the desorbent stream and the extract streams; a third valve which controls the flow of the feed stream between the feed stream header line and a specific adsorbent chamber; a fourth valve which controls the flow of fluid circulating between the interconnected adsorbent chambers; and, a feed valve flush line which directly connects a port on the third valve to a port on the fourth valve.

By continuous process it is meant that the feed stream and a desorbent stream are simultaneously passed into the apparatus at substantially uniform rates while being initially charged to each of the chambers in turn. The term "unique conduit" is intended to refer to a conduit set aside specifically to function as the named conduit; that is, a separate conduit. The term is not intended to indicate any mechanical difference between conduits.

Operating conditions suitable for the subject process include a temperature of about −50 to 300 degrees C., preferably 20 to 100 degrees C. It is generally preferred that the process is operated with a positive pressure in the general range of about 700 to 25000 kPa. Representative flow rates for a small scale unit are 0.1–2.0 ml/min for the feed and 2–20 ml/min for the desorbent. Such units would employ conduits having internal diameters of about 0.3 to about 0.6 cm and could produce 1.0 ton/year or more of dry product depending on the ease of separation. Larger units would have quite a bit larger flow rates, with the maximum feed flow rate being limited only by equipment and economic considerations. The total amount of dry product recovered from the extract in larger units could reach 1000 kg/day. The invention can also be applied in large petrochemical plants.

While the subject invention is envisioned as being primarily suitable for liquid phase flow, it is believed the operating principles and apparatus could be applied to vapor phase flow.

As previously mentioned chromatographic separations can be applied to a wide range of chemical compounds. Rather unusual chemicals such as chiral pharmaceutical intermediates are just one example. Fermentation broths are another. Nonchiral alkyl aromatics, halogenated aromatic compounds or aromatic compounds containing hetero atoms may also be separated using the subject invention. The aromatic compounds may have from one to four or more benzene rings and two or more alkyl groups per ring structure. Compounds having a ring structure other than benzene can be separated. Naphthalenes and indanes are suitable feeds as are oxygenated aromatics such as ethers, esters and alcohols, and carbohydrates including saccharides. Organic acids, proteins and amino acids are other classes of suitable feed compounds. The subject apparatus and process can be used for the separation of one specific compound from a mixture or for the separation of a class of compounds from one or more classes of different compounds. The recovery of normal paraffins from admixture with branched paraffins and/or aromatic hydrocarbons is an example of this type of separation.

The subject invention may therefore be characterized as an apparatus for performing a simulated moving bed continuous chromatographic separation comprising a plurality of individual adsorbent chambers adapted for retaining a bed of adsorbent, a plurality of fluid transfer lines interconnecting the adsorbent chambers and also allowing passage of feed and desorbent streams into the apparatus and removal of extract and raffinate streams from the apparatus, a plurality of valves for controlling the flow of fluids through the fluid transfer lines and between adsorbent chambers, with a separate set of valves being associated with each adsorbent chamber and with said valves being characterized in that two ports of each valve which controls the flow of the feed stream into a specific adsorbent chamber are connected to the fluid transfer line which connects this specific adsorbent chamber with a next upstream adsorbent chamber; whereby fluid discharged from the next upstream adsorbent chamber may flow through the valve and flush the feed stream from the valve and from a conduit leading from this valve to the specific adsorbent chamber.

The subject invention can also be characterized as an apparatus for performing a simulated moving bed adsorptive separation comprising a plurality of individual adsorbent chambers, with each adsorbent chamber containing a bed of adsorbent, a plurality of fluid transfer lines which provide interconnections between the adsorbent chambers and which also provide means for passing feed and desorbent streams into the apparatus and removing extract and raffinate streams from the apparatus, a plurality of valves for controlling the flow of fluids through the fluid transfer lines and adsorbent chambers, with a separate set of valves being associated with each adsorbent chamber, said apparatus being further characterized in that the fluid transfer line for passing the feed stream to an individual adsorbent chamber of the apparatus is connected to a first port of a feed valve having at least three ports, with a second port of the feed valve being connected to a feed stream fluid transfer line which leads to the inlet of the individual adsorbent chamber and with a third port of the feed valve being connected to a feed valve flush line through which a portion of a fluid stream circulating through the apparatus and which is supplied to the individual adsorbent chamber from a next sequential adsorbent chamber, with the second and third ports being interconnected within the feed valve to allow free fluid flow, whereby the contents of the feed stream fluid transfer line may be flushed into the individual adsorbent chamber.

What is claimed:

1. An apparatus for performing a simulated moving bed adsorptive separation, said apparatus comprising a plurality of individual adsorbent chambers adapted for retaining a bed of adsorbent, a plurality of fluid transfer lines interconnecting the adsorbent chambers and also allowing passage of feed and desorbent streams into the apparatus and removal of extract and raffinate streams from the apparatus, a plurality of valves for controlling the flow of fluids through the fluid transfer lines and between adsorbent chambers, with a separate set of valves being associated with each adsorbent chamber and with said valves being characterized in that two ports of each valve which controls the flow of the feed stream into a specific adsorbent chamber are connected to the fluid transfer line which connects this specific adsorbent chamber with a next upstream adsorbent chamber; whereby fluid discharged from the next upstream adsorbent chamber may flow through the valve and flush the feed stream from the valve and from a conduit leading from this valve to the specific adsorbent chamber.

2. The apparatus of claim 1 further characterized in that the apparatus comprises at least three valves per adsorbent chamber, with the valve which controls the flow of the feed stream being located intermediate an upstream valve controlling a process stream removed from an upstream adsorbent chamber and a downstream valve through which the extract and raffinate streams are removed from the apparatus.

3. An apparatus for performing a simulated moving bed adsorptive separation comprising a plurality of individual adsorbent chambers, with each adsorbent chamber containing a bed of adsorbent, a plurality of fluid transfer lines which provide interconnections between the adsorbent chambers and which also provide means for passing feed and desorbent streams into the apparatus and removing extract and raffinate streams from the apparatus, a plurality of valves for controlling the flow of fluids through the fluid transfer lines and adsorbent chambers, with a separate set of valves being associated with each adsorbent chamber, said apparatus being further characterized in that the fluid transfer line for passing the feed stream to an individual adsorbent chamber of the apparatus is connected to a first port of a feed valve having at least three ports, with a second port of the feed valve being connected to a feed stream fluid transfer line which leads to the inlet of the individual adsorbent chamber and with a third port of the feed valve being connected to a feed valve flush line through which a portion of a fluid stream which circulates through the apparatus is supplied to the individual adsorbent chamber from a next sequential adsorbent chamber, with the second and third ports being interconnected within the feed valve to allow free fluid flow, whereby the contents of the feed stream fluid transfer line may be flushed into the individual adsorbent chamber.

4. An apparatus for performing simulated countercurrent moving bed adsorptive separation of a multicomponent feed stream which comprises:

a) a plurality of serially interconnected adsorbent chambers with each adsorbent chamber having an inlet and an outlet on opposite ends of the chamber and adapted to contain a quantity of a selective adsorbent;

b) a feed stream header line;
c) a desorbent stream header line;
d) a raffinate stream header line;
e) an extract stream header line;
f) a set of valves for each adsorbent chamber, with each set of valves comprising:
   i) a first valve which controls the flow of a raffinate stream from the apparatus;
   ii) a second valve which controls the flow of both the desorbent stream and the extract streams;
   iii) a third valve which controls only the flow of the feed stream between the feed stream header line and a specific adsorbent chamber; and,
   iv) a fourth valve which controls the flow of fluid circulating between the interconnected adsorbent chambers; and,
g) a parallel feed valve flush line which directly connects a port on the third valve to a port on the fourth valve.

5. The apparatus of claim 4 further comprising a desorbent recovery header line, with the fourth valve also controlling the discharge from the apparatus of a desorbent recovery stream into the desorbent recovery header line.

6. The apparatus of claim 3 wherein the third valve, which controls the flow of the feed stream, is located upstream of the second valve.

* * * * *